(12) United States Patent
Jung

(10) Patent No.: US 7,637,978 B2
(45) Date of Patent: Dec. 29, 2009

(54) INTAKE DUCT SYSTEM FOR AN ENGINE

(75) Inventor: Suk Hwan Jung, Wanju-gun (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/104,702

(22) Filed: Apr. 17, 2008

(65) Prior Publication Data

US 2009/0151308 A1     Jun. 18, 2009

(30) Foreign Application Priority Data

Dec. 14, 2007   (KR) ...................... 10-2007-0131647

(51) Int. Cl.
*B01D 45/12* (2006.01)
(52) U.S. Cl. .............................. 55/457; 55/396; 55/399; 55/414; 55/424; 55/456
(58) Field of Classification Search .................... 55/356, 55/345, 346, 347, 348, 396, 397, 413, 414, 55/416, 426, 424, 399, 456, 457
See application file for complete search history.

(56) References Cited

U.S. PATENT DOCUMENTS

| | | | | |
|---|---|---|---|---|
| 2,661,076 A | * | 12/1953 | Walker ........................ 55/317 |
| 2,748,888 A | * | 6/1956 | Hodson .......................... 96/61 |
| 3,258,895 A | * | 7/1966 | Wiebe et al. ................... 95/269 |
| 3,362,155 A | * | 1/1968 | Driscoll .................... 60/39.092 |
| 3,517,821 A | * | 6/1970 | Monson et al. ........... 210/512.1 |
| 3,713,280 A | * | 1/1973 | Keller et al. ................... 55/360 |
| 4,159,899 A | * | 7/1979 | Deschenes .................... 55/454 |
| 4,629,481 A | * | 12/1986 | Echols .......................... 55/348 |
| 6,878,189 B2 | * | 4/2005 | Moredock ..................... 95/270 |
| 6,921,424 B2 | * | 7/2005 | Bugli et al. ................. 55/385.3 |

* cited by examiner

*Primary Examiner*—Duane Smith
*Assistant Examiner*—Sonji Turner
(74) *Attorney, Agent, or Firm*—Morgan, Lewis & Bockius LLP

(57) ABSTRACT

A foreign particle eliminating function and durability of an engine may be improved by an intake duct system having a cyclone duct including a cyclone module for generating torque of air, wherein the cyclone module includes: a central shaft; a plurality of cyclone blades that are formed outward from the central shaft; and a turbulence preventing device that is formed at a downstream side of the central shaft of the cyclone module so as to prevent turbulence of the air that has passed the cyclone blade.

13 Claims, 4 Drawing Sheets

INTAKE DUCT SYSTEM FOR AN ENGINE

CROSS-REFERENCE TO RELATED APPLICATION

This application claims priority to and the benefit of Korean Patent Application No. 10-2007-0131647 filed in the Korean Intellectual Property Office on Dec. 14, 2007, the entire contents of which are incorporated herein by reference.

BACKGROUND OF THE INVENTION (a) Field of the Invention

The present invention relates to an engine of a vehicle, more particularly, an intake duct system used for an engine of a vehicle.

(b) Description of the Related Art

An internal combustion engine receives air and fuel and burns them in a combustion chamber in order to produce mechanical power. Such an engine is provided with an intake system in order to supply fresh air into the combustion chamber. In order to supply fresh air so as to increase durability of the engine, an air cleaner that purifies the air is employed.

In order to improve the air purifying function of the intake system, it has been suggested to remove foreign particles by using rotation of air drawn into the engine in addition to employing the air cleaner. As an example, it is proposed to trap foreign particles that are forced toward an interior wall of the duct by inducing rotation of air passing through the duct of the intake system so as to apply a radial biasing force to foreign particles.

For such a function, a cyclone module for generating the rotation of air may be mounted inside the duct, and in this case, research has been undertaken in order to improve efficiency of the cyclone module. When turbulence is generated in the air that passes through the cyclone module, torque generated by the cyclone module for biasing the foreign particles toward the interior wall of the duct may be diminished. In this case, the foreign particle trapping function may be deteriorated since the particles are not applied with sufficient strength of centrifugal force.

Therefore, if the possible turbulence that may occur at a downstream side of the cyclone module may be prevented, performance of the cyclone module and the foreign particle eliminating function of the duct may be improved such that durability of an air cleaner and an engine may accordingly be improved.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an intake duct system having advantages of improved functioning of foreign particle elimination.

An exemplary embodiment of the present invention provides an intake duct system for receiving air and supplying the air to an air cleaner. The exemplary intake duct system includes: a cyclone duct including a cyclone module for generating torque of the air, wherein the cyclone module includes: a central shaft; a plurality of cyclone blades that are formed outward from the central shaft; and a turbulence preventing device that is formed at a downstream side of the central shaft of the cyclone module so as to prevent turbulence of the air that has passed the cyclone blade.

The turbulence preventing device may include a body that includes: an extension shaft extending from a distal end of the central shaft; and a conical end portion formed in a conical shape at a distal end of the extension shaft, wherein the cyclone blade, the central shaft, the extension shaft, and the comical end portion are aligned co-axially along a central axis of the body.

A slant angle of the conical end portion may be approximately 15°, and a longitudinal length of the conical end portion may be larger than 30 mm.

The turbulence preventing device may further include at least one blade that is formed in a spiral shape in the same direction as the cyclone blade at an exterior side of the body.

The blade may protrude from the body at approximately 70° with respect to a central axis of the body.

A partitioning wall may be formed inside the cyclone duct so as to form a foreign particle collecting space together with an interior wall of the cyclone duct and lower portion of the partitioning wall is coupled to the interior wall of the cyclone duct such that the foreign particles forced radially outward may be collected at the space.

In addition, at least a chamber may be formed at a downstream side of the foreign particle collecting space such that the foreign particles collected at the foreign particle collecting space may be trapped by the chamber.

A distal end of the conical end portion may be apart from a top of the partitioning wall by a predetermined distance. The predetermined distance may be 15 mm to 30 mm.

The intake duct system may further include an upper duct engaged with an upstream side of the cyclone duct, wherein the cyclone duct includes a plurality of pipes connected with the upper duct; the cyclone module is mounted in each of a plurality of pipes; and a sum of cross-sections of the plurality of pipes is smaller than a cross-section of the upper duct.

According to an exemplary embodiment of the present invention, the foreign particle eliminating function of an intake system is improved by preventing turbulence at a downstream side of a cyclone module.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
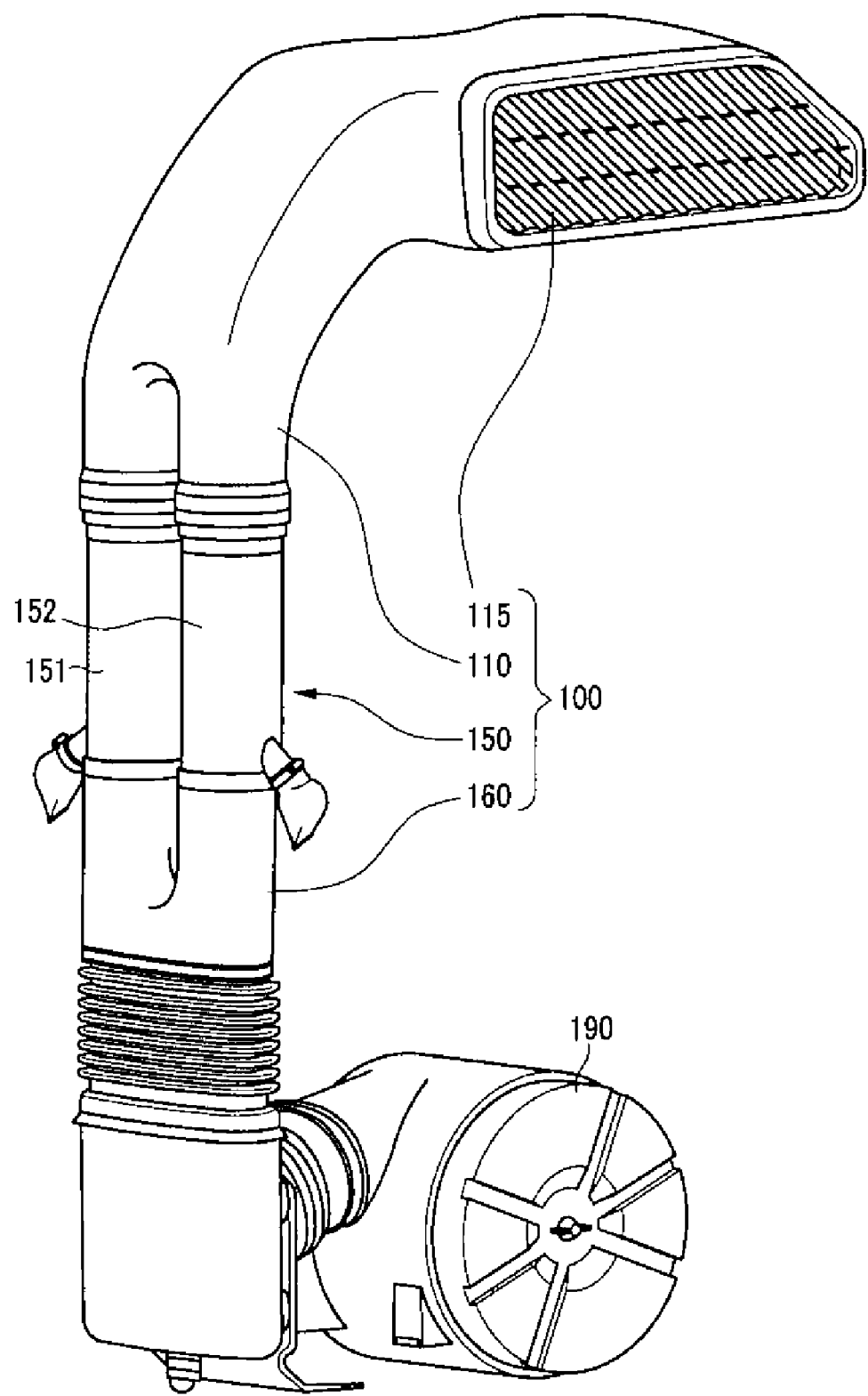
FIG. 1 is a perspective view of an intake duct system of an engine according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

<Description of Reference Numerals Indicating Primary Elements in the Drawings>

| | |
|---|---|
| 100: intake duct system | |
| 110: upper duct | 115: duct grill |
| 150: cyclone duct | 154: foreign particle collecting space |
| 151, 152: pipes | |
| 153: partitioning wall | 155: chamber |
| 160: lower duct | 190: air cleaner |
| 200: cyclone module | |
| 210: central shaft | 220: cyclone blade |
| 250: turbulence preventing device | |
| 260: body of turbulence preventing device | |
| 262: extension shaft | 264: conical end portion |
| 270: blade | |
| h1: length of conical end portion | |
| h2: distance between a distal end of conical end portion and top of partitioning wall | |
| θ1: slant angle of conical end portion with respect to central axis of body | |
| θ2: angle of blade with respect to central axis of body | |

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims An exemplary embodiment of the present invention will hereinafter be described in detail with reference to the accompanying drawings.

FIG. 1 is a perspective view of an intake duct system of an engine according to an exemplary embodiment of the present invention.

An intake duct system 100 for an engine according to an exemplary embodiment of the present invention intakes air and supplies it to an air cleaner 190. As shown in FIG. 1, the intake duct system 100 includes a duct grill 115 through which air enters, an upper duct 110 that receives the air that has passed through the duct grill 115, a cyclone duct 150 that is arranged at a downstream side of the upper duct 110 and includes a cyclone module 200 (refer to FIG. 2 to FIG. 4) inside for generating and applying torque to the air, and a lower duct 160 that delivers the air received from the cyclone duct 150 to the air cleaner 190.

Figure 2:
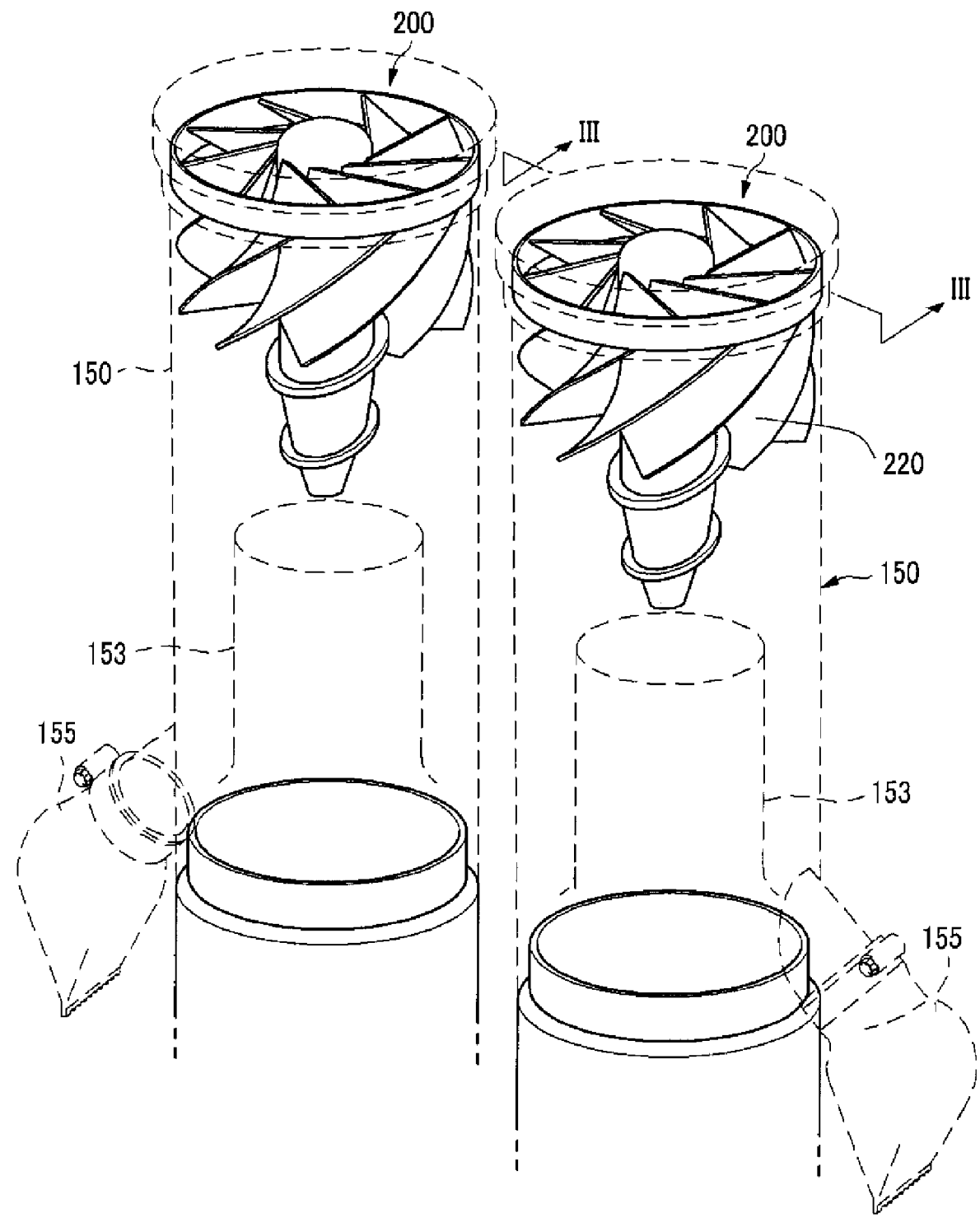
FIG. 2 is a perspective view of a cyclone duct according to an exemplary embodiment of the present invention.
Figure 3:
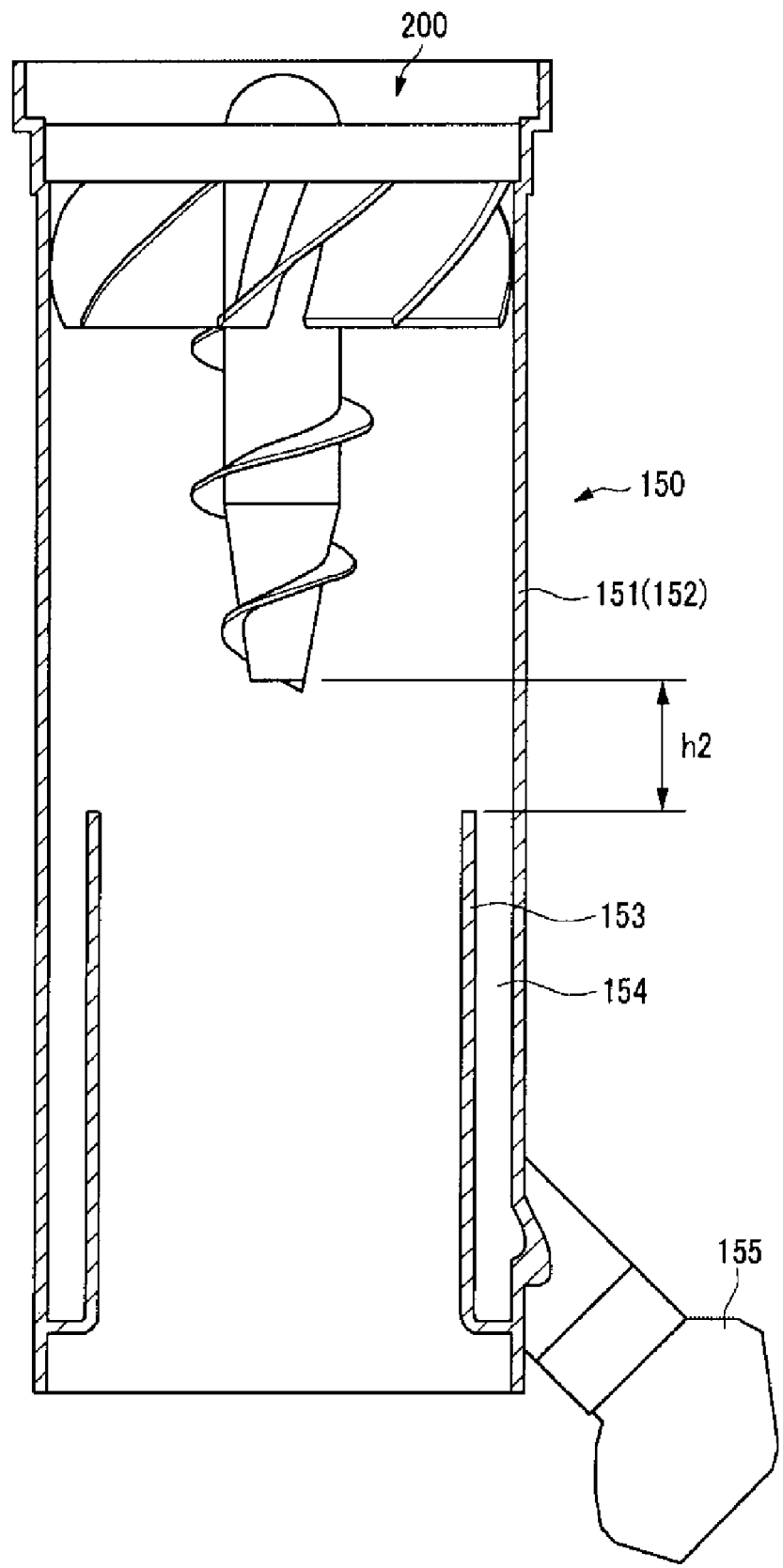
FIG. 3 is a cross-sectional view according to line III-III of FIG. 2.

FIG. 2 is a perspective view of a cyclone duct 150 according to an exemplary embodiment of the present invention, and FIG. 3 is a cross-sectional view according to line III-III of FIG. 2.

The upper duct 110 has a single inlet and two outlets branched therefrom. The cyclone duct 150 may include two pipes 151 and 152 that are respectively connected with the two outlets of the upper duct 110. The cyclone module 200 according to an exemplary embodiment of the present invention is mounted in respective pipes 151 and 152 of the cyclone duct 150.

A sum of cross-sections of the pipes 151 and 152 may be smaller than a cross-section of the upper duct 110. By such an arrangement, the air flows faster through the cyclone duct 150 than through the upper duct 110, and accordingly, the torque generation of the cyclone duct 150 may become stronger.

When the air passes through the cyclone duct 150, the torque is applied to the air by the cyclone module 200, and accordingly foreign particles in the air rotate with rotation of the air. Centrifugal force is applied to the rotating foreign particles such that the foreign particles are forced outward in a radial direction from a center of the cyclone duct 150.

A partitioning wall 153 is formed at an interior side of the cyclone duct 150 so as to form a foreign particle collecting space 154 (refer to FIG. 3) together with an interior wall of the cyclone duct 150, such that the foreign particles that are forced radially outward may be collected in the foreign particle collecting space 154.

That is, when the air rotates while passing through the cyclone duct 150, the foreign particles are forced toward the interior wall of the pipes 151 or 152 by the rotation of the air and flow in the air flowing direction. Therefore, the foreign particles enter into the foreign particle collecting space 154 formed by the partitioning wall 153 and the interior wall of the cyclone duct 150, and thereby the foreign particles are collected in the foreign particle collecting space 154 and separated from the air.

At least a chamber 155 is formed at a downstream side of the foreign particle foreign particle collecting space 154 such that the foreign particles collected at the foreign particle collecting space 154 may be trapped by the chamber 155.

Hereinafter, the cyclone module 200 according to an exemplary embodiment of the present invention is described in further detail with reference to FIG. 4.

Figure 4:
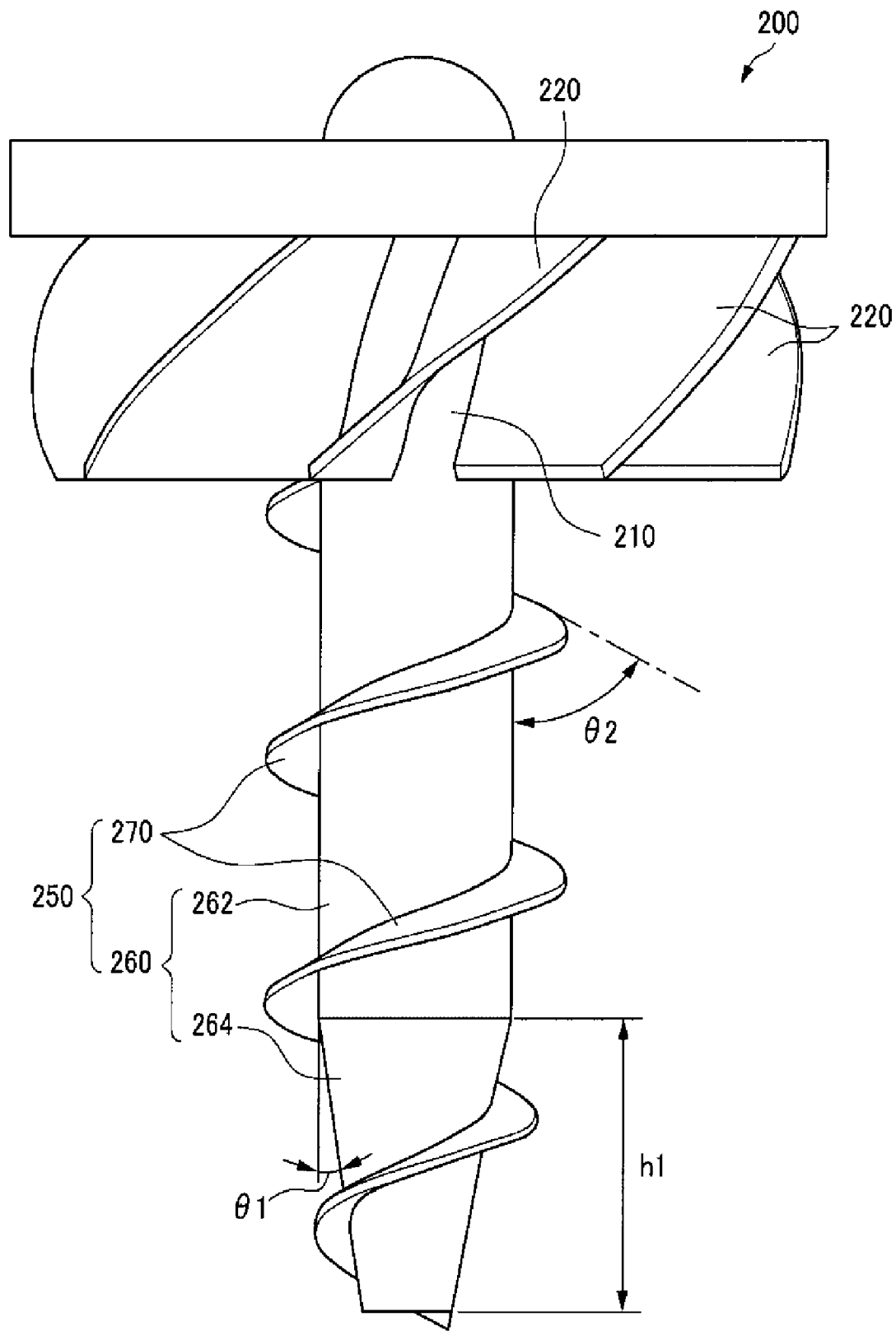
FIG. 4 is a perspective view of a cyclone module according to an exemplary embodiment of the present invention.

FIG. 4 is a perspective view of a cyclone module 200 according to an exemplary embodiment of the present invention.

As shown in FIG. 4, the cyclone module 200 includes: a central shaft 210; a plurality of cyclone blades 220 formed outward from the central shaft 210; and a turbulence preventing device 250 that is formed at a downstream side of the central shaft 210 of the cyclone module 200 so as to prevent turbulence of the air that has passed the cyclone blade 220.

The turbulence preventing device 250 includes a body 260 and at least one blade 270 formed outward the body 260.

The body 260 of the turbulence preventing device 250 includes an extension shaft 262 extending from a distal end of the central shaft 210 and a conical end portion 264 formed in a conical shape at a distal end of the extension shaft 262.

The cyclone blade 220, central shaft 210, blade 270, extension shaft 262 and conical end portion 264 is aligned co-axially with a central axis of the body 260.

A slant angle θ1 of the conical end portion 264 is formed at approximately 15° with respect to the central axis, and a longitudinal length h1 of the conical end portion 264 along the central axis is formed to be larger than 30 mm. The blade 270 is formed in a spiral shape in the same direction as the cyclone blade at the exterior side of body 260, and the blade 270 protrudes from the body 260 by a predetermined angle θ2 (for example, approximately 70°) with respect to the central axis.

While the air rotates by the cyclone blades 220, turbulence tends to occur at the downstream side of the cyclone blade 220. However, such a tendency is diminished by the extension shaft 262. Further, the blade 270 further diminishes such tendency for turbulence, and reinforces the torque of the air generated by the cyclone blade 220.

As the conical end portion 264 gradually narrows from the extension shaft 262, the tendency for turbulence at an end of the extension shaft 262 is diminished.

Referring back to FIG. 3, the distal end of the conical end portion 264 is apart from the top of the partitioning wall 153 by a predetermined distance h2. The predetermined distance h2 may be formed to be 15 mm to 30 mm.

In the above description, specific values are mentioned with respect to the slant angle θ1 and the length h1 of the conical end portion 264, the predetermined angle θ2 between the blade 270 and the central axis of the body 260, and the distance h2 between the distal end of the conical end portion 264 and the top of the partitioning wall 153. However, it should be understood that the specific values are only for better understanding and enablement of an exemplary embodiment of the present invention, and the scope of the present invention is not limited thereto. Values may obviously be altered in various circumstances, for example when a specific shape is adaptively altered to design factors of an engine.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An intake duct system for receiving air and supplying the air to an air cleaner, the intake duct system comprising a cyclone duct including a cyclone module for generating torque of the air, wherein the cyclone module comprises:
   a central shaft;
   a plurality of cyclone blades that are formed outward from the central shaft; and
   a turbulence preventing device that is formed at a downstream side of the central shaft of the cyclone module so as to prevent turbulence of the air that has passed the cyclone blade;
   wherein the turbulence preventing device comprises a body that comprises:
      an extension shaft extending from a distal end of the central shaft; and
      a conical end portion formed in a conical shape at a distal end of the extension shaft and gradually narrowing with a slant angle from the distal end of the extension shaft, wherein the cyclone blade, the central shaft, the extension shaft, and the conical end portion are aligned co-axially along a central axis of the body, and
   wherein the turbulence preventing device further comprises at least one blade that is formed in a spiral shape in the same direction as the cyclone blade at an exterior side of the body.

2. The intake duct system of claim 1, wherein the slant angle of the conical end portion is approximately 15° with respect to the central axis.

3. The intake duct system of claim 1, wherein a longitudinal length of the conical end portion along the central axis is larger than 30 mm.

4. The intake duct system of claim 1, wherein the slant angle of the conical end portion is approximately 15° with respect to the central axis, and a longitudinal length of the conical end portion along the central axis is larger than 30 mm.

5. The intake duct system of claim 1, wherein the blade protrudes from the body by approximately 70° with respect to the central axis of the body.

6. The intake duct system of claim 1, wherein:
   a partitioning wall is formed inside the cyclone duct with a predetermined distance from an interior wall of the cyclone duct so as to form a foreign particle collecting space together with the interior wall of the cyclone duct and lower portion of the partitioning wall is coupled to the interior wall of the cyclone duct such that foreign particles that are forced radially outward by operation of cyclone blade may be collected at the space; and
   at least a chamber is formed at a downstream side of the foreign particle collecting space such that the foreign particles collected at the foreign particle collecting space may be trapped by the chamber.

7. The intake duct system of claim 6, wherein a distal end of the conical end portion is apart from a top of the partitioning wall by a predetermined distance.

8. The intake duct system of claim 7, wherein the predetermined distance is 15 mm to 30 mm.

9. An intake duct system for receiving air and supplying the air to an air cleaner, the intake duct system comprising a cyclone duct including a cyclone module for generating torque of the air, wherein the cyclone module comprises:
   a central shaft;
   a plurality of cyclone blades that are formed outward from the central shaft; and
   a turbulence preventing device that is formed at a downstream side of the central shaft of the cyclone module so as to prevent turbulence of the air that has passed the cyclone blade;
   wherein the turbulence preventing device comprises a body that comprises:
   an extension shaft extending from a distal end of the central shaft; and
   a conical end portion formed in a conical shape at a distal end of the extension shaft and gradually narrowing with a slant angle from the distal end of the extension shaft, wherein the cyclone blade, the central shaft, the extension shaft, and the conical end portion are aligned co-axially along a central axis of the body, wherein:
   the turbulence preventing device further comprises at least one blade that is formed in a spiral shape in the same direction as the cyclone blade at an exterior side of the body;
   a partitioning wall is formed inside the cyclone duct with a predetermined distance from an interior wall of the cyclone duct so as to form a foreign particle collecting space together with the interior wall of the cyclone duct and lower portion of the partitioning wall is coupled to the interior wall of the cyclone duct such that foreign particles that are forced radially outward by operation of cyclone blade may be collected at the space;
   at least a chamber is formed at a downstream side of the foreign particle collecting space such that the foreign particles collected at the foreign particle collecting space may be trapped by the chamber; and a distal end of the conical end portion is apart from a top of the partitioning wall by a predetermined distance.

10. The intake duct system of claim 9, further comprising an upper duct engaged with an upstream side of the cyclone duct, wherein:
the cyclone duct comprises a plurality of pipes connected with the upper duct;
the cyclone module is mounted in each of a plurality of pipes; and
a sum of cross-sections of the cyclone ducts is smaller than a cross-section of the upper duct.

11. The intake duct system of claim 1, further comprising an upper duct engaged with an upstream side of the cyclone duct, wherein:
the cyclone duct comprises a plurality of pipes connected with the upper duct;
the cyclone module is mounted in each of a plurality of pipes; and
a sum of cross-sections of the plurality of pipes is smaller than a cross-section of the upper duct.

12. The intake duct system of claim 6, further comprising an upper duct engaged with an upstream side of the cyclone duct, wherein:
the cyclone duct comprises a plurality of pipes connected with the upper duct;
the cyclone module is mounted in each of a plurality of pipes; and
a sum of cross-sections of the plurality of pipes is smaller than a cross-section of the upper duct.

13. The intake duct system of claim 9, further comprising an upper duct engaged with an upstream side of the cyclone duct, wherein:
the cyclone duct comprises a plurality of pipes connected with the upper duct;
the cyclone module is mounted in each of a plurality of pipes; and
a sum of cross-sections of the plurality of pipes is smaller than a cross-section of the upper duct.

* * * * *